United States Patent Office 2,853,412

Patented Sept. 23, 1958

2,853,412

HIGH TEMPERATURE RESISTING BONDING

Karl F. Hager, Hasbrouck Heights, N. J., and Morris Rosenthal, El Paso, Tex.; said Hager assignor to the United States of America as represented by the Secretary of the Army No Drawing. Application June 17, 1955
Serial No. 516,344

5 Claims. (Cl. 154—129)

(Granted under Title 35, U. S. Code (1952), sec. 266)

The invention described herein may be manufactured and used by or for the Government for governmental purposes without the payment of any royalty thereon.

This application is a continuation-in-part of application S. N. 246,523, filed September 13, 1951.

This invention relates to a method of bonding together the surfaces of non-porous materials, such a metals, and more specifically to a method incorporating the use of a hydrolyzed mixture of silanes as a bonding agent.

In many cases it is necessary to secure a bonding for two metallic surfaces which will resist the adverse affect of exposure to high temperature for certain limits of time. Such bondings might be between two or more pieces of similar or dissimilar material such as sheet metal, metallic foil, etc. Common methods of securing bonds such as welding, brazing, soldering, riveting, etc. may not be feasible or may not be desired. In such cases it is necessary to employ an adhesive to provide the bonding action.

Most of the adhesives known are classified as organic materials. These organic compounds decompose and become charred at relatively low temperatures when compared to those in effect in common use of the present invention. They have no bonding action after being heated up to temperatures of and above 300° C. Temperature limitations alone, therefore, eliminate the use of organic adhesives in high-temperature work, even for a short period of several minutes.

The inorganic adhesives such as water-glass are extremely resistant to high temperatures, but they have the important disadvantage of not being able to dry or set when air is excluded. Subsequently, pieces which are glued together by means of water-glass do not adhere since the adhesive does not dry in a reasonable length of time between the non-porous surfaces. If the water-glass were dried first, the material would no longer serve as adhesive.

Silicones are partly organic and partly inorganic compounds. They are known as fairly heat resistant and are recommended for surface coatings up to 250° C. It has been known, however, that such coatings show: "a gradual loss of the resin through evaporation at temperatures of 316°C; beyond a certain point in this loss the film has lost enough binder to brittle and may crack from shrinkage" (General Electric Company, bulletin on Silicones, page 16).

Even a coating which has been cured at 135° C. for 3 hours will lose about 10% when further treated at 250° C. for 3 hours, according to Dow Corning's Silicones Notes, preliminary data sheet, reference #C 10–3, page 4.

Considering this existing knowledge, it cannot be expected that silicones would give satisfactory bonding between non-porous materials, since the slightest evaporation of material would tend to separate the pieces to be bonded. This should be true especially when the temperatures involved will be up to 400° C.

While various hydrolyzed mixtures of silanes have been known in the art for a number of years and for a number of purposes including coatings, insulation, etc., such mixtures have not heretofore been used alone in bonding the surfaces of non-porous materials, such as metals, together without the use of various other additive compounds, as for example in Poskitt et al., 2,467,853.

It is accordingly an object of this invention to provide a unique method of bonding non-porous surfaces, such as metallic surfaces, together utilizing only a mixture of hydrolyzed silanes in an aromatic solvent, and which requires no partial curing prior to bonding.

It is a further object to provide a method for bonding metal-to-metal which involves only the use of a hydrolyzed mixture of silanes in an aromatic solvent, and which yields a strong bond at high temperatures even without curing.

It is a further object of this invention to provide a unique method of bonding metallic surfaces together, embodying the simple application of a coating of a hydrolyzed silane mixture alone in an aromatic solvent to the surfaces, drying, and pressing the surfaces together.

We have found that a hydrolyzed mixture of 20–50 molar percent phenyltrichlorosilane, 1–15 molar percent methylphenyltrichlorosilane, 20–45 molar percent methyltrichlorosilane, and 15–40 molar percent dimethyldichlorosilane can be used very satisfactorily alone, without pigment additives, curing agents, or the like, and without partial precuring, to bond the surfaces of non-porous material, such as metal, together resulting in a uniform, smooth bonding with good resistance to high temperatures and with high shearing and tensile strength even after heat treatment. The mixture is applied to the surfaces to be bonded in the form of a solution in a volatile solvent, e. g. an aromatic solvent such as toluene, xylene, etc., to give suitable consistency for application in an easy and efficient manner according to the method of the present invention. The applied solution is dried, as by air-drying, until all solvent is removed and the surfaces to be joined are pressed together.

This method combines the following advantages: The adhesive is stable for several hours up to temperatures of 400° C., with the life of the material's adhesive powers decreasing in length as the temperature goes up; the adhesive itself is fireproof once the solvent is removed; the method of application is simple and irregular shaped objects are easily handled; the properties of the adhesive can be varied by changing the ratio of the constituents; dissimilar metals can be bonded; thin foils can be bonded.

*Example 1*

A 50% solution in toluene of a mixture consisting of hydrolyzed phenyltrichlorosilane (34 molar percent), methyltrichlorosilane (33 molar percent), dimethyldichlorosilane (27 molar percent), and methylphenyltrichlorosilane (6 molar percent) was brushed onto an aluminum foil 0.001 inch in thickness and onto a stainless steel cylinder. The thin coat was allowed to air-dry for ½ hour before the aluminum foil and the steel cylinder were bonded together by pressing the treated surfaces together with a slight pressure of the order of 5–10 p. s. i. More or less pressure may be used if desired, for any specific case, it only being necessary to apply sufficient connecting pressure to exclude the excess adhesive from between the surfaces and to insure a substantially even metal-to-metal contact at all points of the bond. The entire set-up was then cured for two hours at 150° C. Tests exposing the aluminum covered cylinder to 400° C. for ½ hour showed that the bond was still secure.

*Example 2*

Stainless steel strips were painted with various mixtures of adhesives and were dried, pressed together under 5–10 p. s. i. connecting pressure, as above, and cured in different ways as follows:

| Adhesive [1] | Air-dried, hours | Cured | Heat Treatment | Shear Strength, p. s. i. |
|---|---|---|---|---|
| A | 2½ | | 400°, ½ hour | 500 |
| B | 2½ | | do | 600 |
| B | 2½ | 150°, 2 hrs | | 150 |
| B | 2½ | 150°, 4 hrs | | 300 |
| B | 2½ | 150°, 6 hrs | | 500 |
| B | 2½ | 170°, 3 hrs | 400°, 2 hours | 700 |
| B | 2½ | do | 500°, 10 min | 200 |

[1] Composition of the adhesives: A. 50% solution in toluene of a hydrolyzed mixture of 33⅓ mol percent of phenyltrichlorosilane, 33⅓ mol percent of methyltrichlorosilane, 16⅔ mol percent dimethyldichlorosilane, and 16⅔ mol percent of methylphenyltrichlorosilane. B. 50% solution in toluene of an equinolar mixture of phenyltrichlorosilane, dimethyldichlorosilane, and methyltrichlorosilane, hydrolyzed.

We do not intend to be limited by the specific illustrative examples above, but solely by the scope of the appended claims.

We claim:

1. The method of bonding two metallic surfaces together with a bond resistant to high temperatures, consisting of coating each of the surfaces with a mixture in solution of hydrolyzed chlorosilanes consisting essentially of 20–50 molar percent phenyltrichlorosilane, 20–45 molar percent methyltrichlorosilane, 15–40 molar percent dimethyldichlorosilane, and 1–15 molar percent methylphenyltrichlorosilane, the total chlorosilanes constituting 100 molar percent of said mixture, drying each coating to a tacky state and until all solvent is removed, and pressing the two surfaces together.

2. The method of bonding two metallic surfaces together with a bond resistant to high temperatures, consisting of coating each of the surfaces with a mixture of hydrolyzed chlorosilanes consisting essentially of 20–50 molar percent phenyltrichlorosilane, 20–45 molar percent methyltrichlorosilane, 15–40 molar percent dimethyldichlorosilane, and 1–15 molar percent methylphenyltrichlorosilane, the total chlorosilanes constituting 100 molar percent of said mixture, said mixture being in dissolved state in an aromatic solvent; drying each coating to a tacky state, pressing the two surfaces together; and heat curing the chlorosilanes at 150–170° C., for 2–6 hours, said surfaces being held together during such curing.

3. The method of bonding two metallic surfaces together with a bond resistant to high temperatures, consisting of coating each of the surfaces with a mixture of hydrolyzed chlorosilanes consisting essentially of 20–50 molar percent phenyltrichlorosilane, 20–45 molar percent methyltrichlorosilane, 15–40 molar percent dimethyldichlorosilane, and 1–15 molar percent methylphenyltrichlorosilane, the total chlorosilanes constituting 100 molar percent of said mixture, said mixture being in dissolved state in an aromatic solvent; air-drying each coating to entirely remove all solvent; and pressing the two surfaces together.

4. The method of bonding two metallic surfaces together with a bond resistant to high temperatures, consisting of coating each of the surfaces with a mixture of hydrolyzed chlorosilanes consisting of 34 molar percent phenyltrichlorosilane, 33 molar percent methyltrichlorosilane, 27 molar percent dimethyldichlorosilane, and 6 molar percent methylphenyltrichlorosilane, said mixture being in dissolved state in an aromatic solvent; drying each coating until the solvent is removed; and pressing the two surfaces together.

5. The method of bonding two metallic surfaces together with a bond resistant to high temperatures, consisting of coating each of the surfaces with a mixture of hydrolyzed chlorosilanes consisting of 33⅓ molar percent phenyltrichlorosilane, 33⅓ molar percent methyltrichlorosilane, 16⅔ molar percent dimethyldichlorosilane, and 16⅔ molar percent methylphenyltrichlorosilane, said mixture being in dissolved state in an aromatic solvent, drying each coating to remove the solvent therefrom, and pressing the two surfaces together.

References Cited in the file of this patent

UNITED STATES PATENTS

| | | |
|---|---|---|
| 2,467,853 | Poskitt et al. | Apr. 19, 1949 |
| 2,477,330 | Doyle | July 26, 1949 |
| 2,573,337 | Hyde | Oct. 30, 1951 |

OTHER REFERENCES

General Electric, The Silicone Story, July 1952.